(12) United States Patent
Li

(10) Patent No.: US 8,354,488 B2
(45) Date of Patent: Jan. 15, 2013

(54) REACTIVE SURFACTANTS AND THEIR USE IN EMULSIONS AND DISPERSIONS

(75) Inventor: Leo Zhaoqing Li, Shanghai (CN)

(73) Assignee: Rhodia Operations (FR)

( * ) Notice: Subject to any disclaimer, the term of this patent is extended or adjusted under 35 U.S.C. 154(b) by 562 days.

(21) Appl. No.: 12/378,794

(22) Filed: Feb. 19, 2009

(65) Prior Publication Data
US 2009/0163650 A1 Jun. 25, 2009

Related U.S. Application Data

(62) Division of application No. 11/729,354, filed on Mar. 28, 2007, now Pat. No. 7,585,927.

(60) Provisional application No. 60/787,368, filed on Mar. 30, 2006.

(51) Int. Cl.
C08F 16/16 (2006.01)
(52) U.S. Cl. .......... 526/332; 526/333; 526/312
(58) Field of Classification Search .......... 526/333, 526/312, 332
See application file for complete search history.

(56) References Cited

U.S. PATENT DOCUMENTS

| | | | |
|---|---|---|---|
| 4,285,720 A | 8/1981 | Scher | 504/112 |
| 4,938,797 A | 7/1990 | Hasslin et al. | 504/359 |
| 5,180,498 A | 1/1993 | Chen et al. | 210/697 |
| 5,527,468 A | 6/1996 | Boyette et al. | 210/698 |
| 5,837,290 A | 11/1998 | Hasslin | 424/489 |
| 5,866,153 A | 2/1999 | Hasslin et al. | 424/408 |
| 6,262,152 B1 | 7/2001 | Fryd et al. | 524/90 |
| 6,391,923 B1* | 5/2002 | Pollmann et al. | 514/714 |
| 2004/0197357 A1 | 10/2004 | Heming et al. | 424/401 |

FOREIGN PATENT DOCUMENTS

| | | |
|---|---|---|
| EP | 216479 A1 | 8/2012 |
| JP | 9-286851 | 11/1997 |

OTHER PUBLICATIONS

Sakai, E. et al , Molecular Structure and Dispersion-Adsorption Mechanisms of Comb-Type Superplasticizers Used in Japan, Journal of Advanced Concrete Technology 2003, 1 (1) 16025.

Zubov, V.P. et al , Reactivity of Allyl Monomers in Radical Polymerization, Journal of Macromolecular Science, Chemistry, 1979, A13(1), 111-31.

Bevington, J.C. et al Journal of Macromolecular Science, Pure and Applied Chemistry 2001, A38(7), 624-640.

Plessis, C. et al, Intramolecular Chain Transfer to Polymer in Emulsion Polymerization of 2-Ethylhexyl Acrylate, Macromolecules, 34, 6138-6143 (2001).

Ahmad, N.M. et al , Chain Transfer to Polymer in Free-Radical Solution Polymerization of n-Butyl Acrylate Studied by NMR Spectroscopy, Macromolecules 1998, 31, 2822-2827.

Glossary of Basic Terms in Polymer Science (IUPAC Recommendations 1996), Pure Appl. Chem., vol. 68, No. 12, pp. 2287-2311, 1996.

* cited by examiner

Primary Examiner — Ling Choi
Assistant Examiner — Thuy-Ai Nguyen

(57) ABSTRACT

A reactive polymeric surfactant that contains: (a) at least two hydrophilic monomeric units per molecule, each independently according to formula (I):

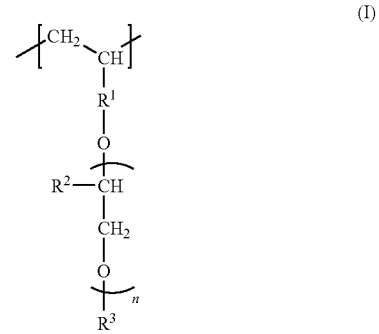

wherein $R^1$ is alkylene or oxyalkylene, $R^2$ is H, methyl, or ethyl, $R^3$ is H, and n is greater than about 5, (b) one or more hydrophobic monomeric units per molecule, each independently according to formula (II)

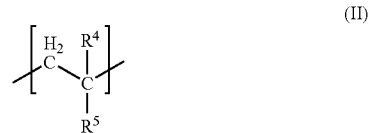

wherein $R^4$ is H or methyl, $R^5$ is a hydrophobic group, is useful in stabilizing aqueous emulsions and aqueous dispersions.

32 Claims, No Drawings

REACTIVE SURFACTANTS AND THEIR USE IN EMULSIONS AND DISPERSIONS

This application is a divisional application of and claims the benefit of U.S. patent application Ser. No. 11/729,354, filed Mar. 28, 2007 and claims the benefit of U.S. Provisional Application No. 60/787,368, filed Mar. 30, 2006.

FIELD OF THE INVENTION

This invention relates to reactive polymeric surfactants and their use in stabilizing aqueous liquid emulsions and aqueous particle dispersions.

BACKGROUND OF THE INVENTION

Use of reactive polymeric surfactants having hydrophilic and hydrophobic substituent groups in the formation of emulsions is known, as illustrated in WO 02/100525. The use of "structured polymers" having hydrophilic and hydrophobic substituent groups in the formation of dispersions is also known (U.S. Pat. No. 6,262,152). In each case, the relevant polymers are difficult or expensive to produce industrially and/or lack of sufficient surfactant-like properties. Some of the processes for producing these polymers involved metal-containing catalyst, which can be difficult to remove from the product and can be a concern with respect to industrial hygiene and environment. Furthermore, reactive polymeric surfactant containing a hydrophilic substituents derived from methoxy polyethylene glycol methacrylate (MPEGMA), can be produced at a relatively lower cost, but tend to be unstable under alkaline conditions. Known MPEGMA co-polymers typically lack sufficient surfactant properties.

There is a need to have a reactive polymeric surfactant system that possesses sufficient surfactant properties, can be manufactured economically, is resistant to hydrolysis under alkaline conditions, and is environment friendly.

SUMMARY OF THE INVENTION

In a first aspect, the present invention is directed to a reactive polymeric surfactant, comprising:
(a) at least two hydrophilic monomeric units per molecule, each independently according to formula (I):

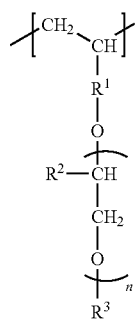

wherein:
$R^1$ is alkylene or oxyalkylene
$R^2$ is H, methyl, or ethyl,
$R^3$ is H, and
n is greater than about 5, and
(b) one or more hydrophobic monomeric units per molecule, each independently according to formula (II)

wherein:
$R^4$ is H or methyl,
$R^5$ is a hydrophobic group.

The reactive polymeric surfactant of the present invention provides reactive sites on hydrophilic groups of the surfactant, that is the terminal hydroxyl groups of the poly (oxyalkylene) groups of the hydrophilic monomeric units according to formula (I) that are available for further reaction, and that may, for example, be crosslinked with a suitable crosslinking agent, such as a compound having two or more isocyanate functional groups per molecule, to form a polymer network. Furthermore, the hydrophilic poly (oxyalkylene) groups of the monomeric units according to formula (I) are resistant to hydrolysis, even under alkaline conditions.

In a second aspect, the present invention is directed to a method for stabilizing an emulsion of a discontinuous liquid phase in a continuous liquid phase, wherein one of such phases comprises an aqueous liquid and the other of such phases comprises a water immiscible liquid, comprising:
(a) providing the above described reactive polymeric surfactant and a crosslinking agent for the reactive polymeric surfactant at an interface between the discontinuous liquid phase and the continuous liquid phase, and
(b) reacting the reactive polymeric surfactant with the crosslinking agent to form a polymer network at the interface.

In a third aspect, the present invention is directed to an emulsion, comprising:
(a) an aqueous liquid phase,
(b) a water immiscible liquid phase, there being at least one interface between the aqueous liquid phase and the water immiscible liquid phase, and
(c) a polymer network disposed at the at least one interface, wherein said polymeric network comprises the reaction product of the above described reactive polymer surfactant, and a crosslinking agent for the reactive surfactant.

In a fourth aspect, the present invention is directed to a method for stabilizing a dispersion of solid particles in an aqueous medium, comprising:
(a) providing the above described reactive polymeric surfactant, and a crosslinking agent for the reactive polymeric surfactant at an interface between the solid particles and the aqueous medium, and
(b) reacting the reactive polymeric surfactant with the crosslinking agent to form a polymer network at the interface.

In a fifth aspect, the present invention directed to an aqueous dispersion comprising:
(a) an aqueous medium, and
(b) one or more particles dispersed in the liquid medium, said particles each having a particle core, said particle cores each having an outer surface, and said particles each having a polymer network disposed on at least a portion of the outer surface of the particle core, wherein said polymeric network comprises the reaction product of the above described reactive polymer surfactant and a crosslinking agent for the reactive surfactant.

DETAILED DESCRIPTION OF INVENTION AND PREFERRED EMBODIMENTS

As used herein, the term "alkyl" means a saturated hydrocarbon radical, which may be straight or branched, such as, for example, methyl, ethyl, n-propyl, iso-propyl, n-butyl, sec-butyl, t-butyl, pentyl, n-hexyl.

As used herein, the term "cycloalkyl" means a saturated ($C_5$-$C_{22}$)hydrocarbon radical that includes one or more cyclic alkyl rings, such as, for example, cyclopentyl, cyclooctyl, and adamantanyl.

As used herein, the term "hydroxyalkyl" means an alkyl radical, more typically a ($C_1$-$C_{22}$)alkyl radical, that is substituted with a hydroxyl groups, such as for example, hydroxymethyl, hydroxyethyl, hydroxypropyl, and hydroxydecyl.

As used herein, the term "aminoalkyl" means an alkyl radical, more typically a ($C_1$-$C_{22}$)alkyl radical, that is substituted with an amino group, such as aminobutyl.

As used herein, the term "glycidalalkyl" means an alkyl radical, more typically a ($C_1$-$C_{22}$)alkyl radical, that is substituted with a glycidal group, such as glycidalethyl.

As used herein, the term "carboxyalkyl" means an alkyl radical, more typically a ($C_1$-$C_{22}$)alkyl radical, that is substituted with a carboxy group, such as for example, carboxyethyl.

As used herein, the term "alkylene" means a bivalent acyclic saturated hydrocarbon radical, including methylene, polymethylene, and alkyl substituted polymethylene radicals, such as, for example, dimethylene, tetramethylene, and 2-methyltrimethylene.

As used herein, "oxyalkylene" means bivalent radical comprising an alkylene radical that is substituted with an oxy group, such as, for example, oxymethylene, and oxydimethylene.

As used herein, the term "alkenyl" means an unsaturated straight chain, branched chain, or cyclic hydrocarbon radical that contains one or more carbon-carbon double bonds, such as, for example, ethenyl, 1-propenyl, 2-propenyl.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, such as, for example, phenoxy, phenyl, methylphenyl, dimethylphenyl, trimethylphenyl, chlorophenyl, trichloromethylphenyl, aminophenyl.

As used herein, the term "aralkyl" means an alkyl group substituted with one or more aryl groups, such as, for example, phenylmethyl, phenylethyl, triphenylmethyl.

As used herein, the terminology "($C_r$-$C_s$)" in reference to an organic group, wherein r and s are each integers, indicates that the group may contain from r carbon atoms to s carbon atoms per group.

As used herein, the terminology "ethylenic unsaturation" means a terminal (that is, α, β) carbon-carbon double bond.

As used herein, the term "(meth)acrylates" in reference to a compound refers collectively to the acrylate and methacrylate analogs of such compound. For example a reference to ethylhexyl (meth)acrylate means ethylhexyl acrylate and its ethylhexyl methacrylate analog.

As used herein, the terminology "surfactant" means a compound that when dissolved in an aqueous medium lowers the surface tension of the aqueous medium.

As used herein, each of the terms "monomer", "polymer", "copolymer", "random copolymer", "alternating copolymer", "block copolymer", and "graft copolymer", has the meaning ascribed to it in *Glossary of basic terms in polymer science* (IUPAC Recommendations 1996), *Pure Appl. Chem.*, Vol. 68, No. 12, pp. 2287-2311, 1996.

As used herein, an indication certain substituent group of an embodiment of the invention is "as described above" refers separately to each previous description, including the broadest description and any narrower descriptions, of such substituent group that is applicable in the context of that embodiment.

In one embodiment, $R^1$ is methylene, $R^2$ is H, $R^3$ is hydrogen, and n is an integer from about 5 to about 100, more typically from about 10 to about 60.

In one embodiment, the reactive polymeric surfactant further comprises monomeric units according to formula (I) wherein $R^1$ is alkylene or oxyalkylene, $R^2$ is H, methyl, or ethyl, more typically H, $R^3$ is —$SO_3^-$X, or —$PO_3^{2-}$2X, X is a cation, and n is greater than about 5, more typically from about 5 to about 100, and even more typically from about 10 to about 60.

In one embodiment, $R^5$ is $R^6$ or

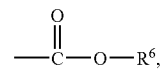

and $R^6$ is alkyl, cycloalkyl, aryl, or aralkyl.

The reactive polymeric surfactant of the present invention may, optionally, further comprise monomeric units other than the monomeric units according to formula (I) and formula (II), such as monomeric units that comprise reactive functional groups or ionic groups. Monomeric units that comprise reactive functional groups, such as aminoalkyl groups, provide additional potential sites for crosslinking the reactive polymeric surfactant. Ionic groups, such as quaternary ammonium salt groups, or sulfate groups, can be used to modify the surfactant properties of the reactive polymeric surfactant.

In one embodiment, the reactive polymeric surfactant of the present invention further comprises one or more monomeric units per molecule, each independently according to formula (III):

(III)

wherein
  $R^7$ is H or methyl, and
  $R^8$ comprises a reactive functional group, an ionic group, or a group comprising a reactive functional group and an ionic group.

In one embodiment, $R^8$ is alkenyl, aminoalkyl, hydroxyalkyl, glycidalalkyl, a quaternary ammonium salt group, an acid group, an acid salt group, or

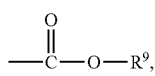

or

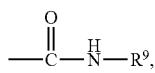

and $R^9$ is H, aminoalkyl, hydroxyalkyl, glycidal alkyl, a quaternary ammonium salt group, an acid group, or an acid salt group.

Suitable quaternary ammonium salts include those according to:

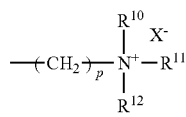

wherein:

$R^{10}$, $R^{11}$, and $R^{12}$ are each independently alkyl, an acid group, or an acid salt group, and $X^-$ is an anion, such as $Cl^-$.

Suitable acid groups include carboxyalkyl groups. Suitable acid salt groups include carboxylate salt groups, such as —$R^{13}COO^-X^+$, sulphonate salt groups, such as —$R^{14}SO_3^-X^+$, sulfate salt groups such as —$R^{15}OSO_3^-$, phosphonate salt groups, such as —$R^{16}PO_3^{-2}\ 2X^+$, and phosphate salt groups such as —$R^{17}OPO_3^{-2}2X^+$, wherein $R^{12}$, $R^{13}$, $R^{14}$, $R^{15}$, $R^{16}$, and $R^{17}$ are each alkyl, and $X^+$is in each case a cation, such as $Na^+$, $K^+$, and ammonium ions.

It will be appreciated that a given substituent group may serve more than one function and fall within more than one of the above described categories of hydrophilic group, hydrophobic group, reactive functional group, and ionic group, for example, acid salt functional groups provide anionic sites as well as reactive sites and may be used as crosslinking sites by, as described below, reaction with a suitable crosslinker.

In one embodiment the hydrophilic monomeric units according to formula (I) are each derived from a monomer according to formula (IV):

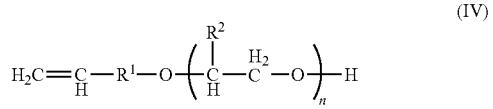

(IV)

wherein $R^1$, $R^2$, and n are each as described above.

Suitable hydrophilic monomers according to formula (IV) include allyl poly(ethylene glycol), vinyl oxybutylene poly(ethylene glycol), or vinyl oxy poly(ethylene glycol).

In one embodiment, the hydrophobic monomeric units of the reactive polymeric surfactant are derived from known ethylenically unsaturated hydrophobic monomers that are copolymerizable with the hydrophilic monomer according to formula (IV). Particularly useful hydrophobic monomers include alkyl, aryl, and aralkyl (meth)acrylates, vinyl aromatic monomers, such as styrene, α-methyl styrene, and vinyl toluene, and ethylenically unsaturated aliphatic hydrocarbon monomers, such as isoprene and butadiene.

In one embodiment, the polymeric surfactant hydrophobic monomeric units according to formula (II) are each derived from a monomer according to (V):

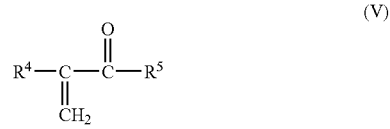

(V)

wherein $R^4$ and $R^5$ are each defined as above.

Suitable hydrophobic monomers according to formula (V) include, for example, methyl (meth)acrylate, ethyl (meth)acrylate, butyl (meth)acrylate, propyl (meth)acrylate, isobutyl (meth)acrylate, hexyl (meth)acrylate, 2-ethyl hexyl (meth)acrylate, nonyl (meth)acrylate, lauryl (meth)acrylate.

In one embodiment, monomeric units according to formula (III) are each derived from an ethylenically unsaturated monomer that comprises a reactive functional group, an ionic group or a reactive functional and an ionic group. Particularly useful monomers that comprise a reactive functional group include amino-, hydroxy-, carboxy- or epoxy-functional ethylenically unsaturated monomers. Particularly useful monomers that comprise an ionic group include acid salt- and quaternary ammonium salt-functional ethylenically unsaturated monomers In one embodiment, the polymeric surfactant comprises reactive monomeric units derived from a monomer according to (VI):

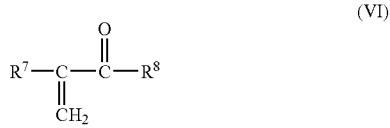

(VI)

wherein $R^7$ and $R^8$ are each defined as above.

Suitable reactive monomers according to formula (VI) include, for example, t-butylaminoethyl methacrylate, N-(3-aminopropyl)methacrylamide, 2-aminoethyl methacrylate, hydroxyethyl methacrylate, hydroxypropyl methacrylate, acrylic acid, methacrylic acid, glycidal methacrylate.

Suitable ionic monomers according to formula (VI) include:

anionic monomers such as for example, salts of acid monomers, such as acrylic acid, methacrylic acid, mono-2-(methacryloyloxy)ethyl succinate, cationic monomers such as for example, salts of dimethylaminoethyl methacrylate and salts of trimethylammoniumethyl methacrylate, amphoteric monomers, such as 2-(N,N-dimethyl-N-(2-methacryloxyethyl) ammonium ethanoic acid, 3-(N,N-dimethyl-N-(2-methacryloxyethyl ammonium) propyl sulfonic acid.

In one embodiment, a portion of the hydroxyl end groups of the hydrophilic monomeric units of the reactive polymer surfactant derived from the monomer according to formula (IV) are sulfated or phosphorylated to provide sulfonic acid salt or phosphoric acid salt groups.

In one embodiment, the reactive polymeric surfactant comprises, based on the total number of monomeric units of the surfactant, from about 20 to about 90 percent by weight ("wt %"), more typically from about 40 to about 80 wt %, and even more typically from about 50 to about 70 wt %, hydrophilic monomeric units according to formula (I), from about 10 to about 80 wt %, more typically from about 20 to about 60 wt %, and even more typically from about 30 to about 50 wt %, hydrophobic monomeric units according to formula (II), from about 0 to about 30 wt %, more typically from about 0 to about 20 wt %, and even more typically from about 0 to about 10 wt %, reactive monomeric units according to formula (III).

In one embodiment, the polymer of the present invention exhibits a weight average molecular weight ("$M_w$") of from about 1,000 to about 200,000 grams per mole ("g/mol"), more typically from about 2,000 to about 100,000 g/mol, and even more typically from about 5,000 to about 50,000 g/mol. $M_w$ is typically determined by fractionating a solution of the polymer using, for example, size exclusion chromatography, and then determining the molecular weight of each of such polymer fractions, for example, by measuring the intensity of light scattering by the fractions or by measuring the refractive index of the fractions and comparing the refractive index results to those obtained for a polymer of known molecular weight.

The reactive polymeric surfactant of the present invention may be a random copolymer, an alternating copolymer or a graft copolymer, or a block copolymer.

Methods for making suitable random and block polymers are known in the art. In one embodiment, the reactive polymeric surfactant is made by known free radical polymerization processes using ethylenically unsaturated monomers. In another embodiment, the reactive polymeric surfactant is made by known controlled free radical polymerization techniques, such as reversible addition fragmentation transfer (RAFT), macromolecular design via interchange of xanthates (MADIX).

Suitable crosslinking agents for the reactive polymeric surfactant of the present invention are compounds having two or more functional groups per molecule that are capable of reacting with functional groups, such as $R^3$ and $R^8$, of the reactive polymeric surfactant of the present invention.

In one embodiment, $R^3$ is H, the polymer network of the present invention is derived by reaction of the reactive polymeric surfactant of the present invention with an isocyanate-functional crosslinking agent. Suitable isocyanate-functional crosslinking agents include, for example, such as diisocyanate, m-tetramethylxylene diisocyanate, hexamethylene diisocyanate trimer, toluene diisocyanate, isophorone diisocyanate.

The reactive functional groups of the reactive polymeric surfactant of the present invention provide reactive sites for crosslinking using a suitable crosslinking agent. For example:

hydroxyl groups provide crosslinking sites for reaction with an isocyanate-functional crosslinking agent amino groups provide crosslinking sites for reaction with isocyanate-acetoacetoxy-, aldehyde-, or epoxide-functional crosslinkers, acid groups provide crosslinking sites for reaction with isocyanate-, aziridine-, or carbodiimide-functional crosslinking agents, epoxide groups provide crosslinking sites for reaction with amino-functional crosslinking agents.

In one embodiment, a catalyst is used to promote the desired crosslinking reaction. Suitable catalysts for promoting reaction of an isocyanate-functional crosslinker with a hydroxyl-functional reactive polymeric surfactant include, for example, dibutyl tin dilaurate, tributyl amine, trioctyl amine, and tridodecyl amine.

The aqueous phase of the emulsion and dispersion of the present invention comprises water, more typically greater than about 40% by weight (wt %) water, more typically greater than about 50 wt % water, and optionally may further comprise one or more water miscible organic solvents, such as for example, ($C_1$-$C_8$)alkanols, such as for example, methanol, ethanol, hexanol, and mixtures thereof.

In one embodiment, the emulsion of the present invention is an emulsion of a discontinuous aqueous phase in a continuous second liquid phase.

In one embodiment, the emulsion of the present invention is an emulsion of a discontinuous second liquid phase in a continuous aqueous liquid phase.

In one embodiment, the second liquid phase comprises a water immiscible liquid, such as a hydrocarbon solvent, a herbicide, insecticide, fungicide, bactericide, plant growth regulator, fertilizer, dye, ink, or pharmaceutical active ingredient.

In one embodiment, the discontinuous phase is in the form of droplets, at least a portion of which are each encapsulated within a substantially continuous shell of the polymer network.

In one embodiment, the dispersion of the present invention is a dispersion of solid water insoluble or partially water soluble particles.

In one embodiment, the particle core comprises a solid pesticide, herbicide, insecticide, fungicide, bactericide, plant growth regulator, fertilizer, dye, ink, or pharmaceutical active ingredient.

In one embodiment, the particles comprise a solid particle core is surrounded by a substantially continuous shell of the polymer network.

In one embodiment, the polymer network is formed in the aqueous medium by an interfacial polymerization process.

In one embodiment, the emulsion of the present invention is made by:

mixing together a reaction mixture comprising continuous aqueous phase, a reactive polymeric surfactant according to the present invention, a crosslinking agent for the reactive polymeric surfactant, and a water immiscible liquid to disperse the water immiscible liquid as a discontinuous phase in the continuous aqueous phase, and reacting the reactive polymeric surfactant with the crosslinking agent at the interface between the aqueous phase and the discontinuous second liquid phase to form the polymer network.

In one embodiment, the reaction mixture comprises from about 30 to about 95 parts by weight ("pbw") of an aqueous medium, from about 70 to about 5 pbw water immiscible liquid, from about 0.05 to about 20 reactive polymeric surfactant per 100 pbw water immiscible liquid, and from about 0.05 pbw to about 20 pbw crosslinking agent per 100 pbw of water immiscible liquid. The reaction mixture may optionally further include other surfactants.

In one embodiment, the dispersion of the present invention is made by:

mixing together a reaction mixture comprising continuous aqueous phase, a reactive polymeric surfactant according to the present invention, a crosslinking agent for the reactive polymeric surfactant, and water insoluble particles to disperse particles in the continuous aqueous phase, and reacting the reactive polymeric surfactant with the crosslinking agent at the interface between the aqueous phase and the particles to form the polymer network on the surfaces of the polymers.

In one embodiment, the reaction mixture comprises from about 30 to about 95 pbw aqueous medium, from about 70 to about 5 pbw solid water insoluble particles, from about 0.05 to about 20 reactive polymeric surfactant per 100 pbw water insoluble particles and from about 0.05 pbw to about 20 pbw crosslinking agent per 100 pbw water insoluble particles. The reaction mixture may optionally further include other surfactants.

The emulsion and dispersion according to the present invention exhibit improved stability, even at pH greater than 7.

EXAMPLE 1

A hydroxyl-functional reactive polymer surfactant according to the present invention is made as follows. To a 500 ml reaction flask equipped with mechanic stirrer, nitrogen inlet, condenser and thermometer was charged 100 grams of allyl alcohol ethoxylate (20 moles of EO per mole, APEG-20, known as Rhodasurf AAE from Rhodia). The reactor contents were heated to 110° C. over 45 to 60 minutes under nitrogen sparge with stirring. Mixing and sparging were each maintained through the reaction. Once the temperature reached 110° C., 1.2 grams of ethylhexyl acrylate and 2.0 grams of 16.67% 1,1'-azobis(cyanocyclohexane) (Vazo 88), solution in toluene were added, followed by feeding simultaneously 45.8 grams of ethylhexyl acrylate over 3 hours and 10 grams of the above 1,1'-azobis(cyanocyclohexane) solution over 3 hours and 5 minutes. The reaction temperature were kept at 108-110° C. during the addition and extended to another two hours. Toluene was then stripped in house vacuum and the temperature was reduced to 90° C. To eliminate any residual ethylhexyl acrylate, 0.06 grams of 2,2'-azobis(2-methylbutyronitrile) was added, the batch was kept at 90° C. for one hour. The product so prepared was soluble in water and is a good emulsifier.

EXAMPLE 2

An ionic group-bearing reactive polymeric surfactant with reactive group on hydrophilic segment was made as follows. To a 500 ml reaction flask equipped with mechanic stirrer, nitrogen inlet, condenser, and thermometer was charged 100 grams of allyl alcohol ethoxylate (20 mols of EO per mole (APEG-20)), 10 grams of 40% 3-allyloxy-2-hydroxylpropanesulfonic acid, sodium salt in water, known as Sipomer COPS-1 from Rhodia Inc. The reactor contents were heated to 110° C. over 45 to 60 minutes under nitrogent sparge and stirring. Mixing and sparging were each maintained through the reaction. Once the temperature reached 110° C., 1.0 grams of ethylhexyl acrylate and 2.0 grams of 16.67% 1,1'-azobis(cyanocyclohexane) (Vazo 88), solution in toluene were added, followed by feeding simultaneously 40.7 grams of ethylhexyl acrylate over 3 hours 45 minutes and 10.5 grams of the above 1,1'-azobis(cyanocyclohexane) solution over 3 hours and 50 minutes. The reaction temperature were kept at 108-110° C. during the addition and extended to another hour. To eliminate any residual ethylhexyl acrylate, 0.50 grams of the above 1,1'-azobis(cyanocyclohexane) solution was added, the batch was kept at 110° C. for one hour. Toluene and water was then stripped in house vacuum. The product so prepared was soluble in water and is a good emulsifier as tested with toluene in water.

EXAMPLE 3

An ionic-group-bearing reactive polymeric surfactant, with reactive groups on hydrophilic and hydrophobic segments, in which acrylic acid was utilized as both reactive and ionic groups, was made as follows. To a 500 ml reaction flask equipped with mechanic stirrer, nitrogen inlet, condenser and thermometer was charged 100 grams of allyl alcohol ethoxylate (20 mols of EO per mole (APEG-20)). The reactor contents were heated to 110° C. over 45 to 60 minutes under nitrogent sparge and stirring. Mixing and sparging were each maintained through the reaction. Once the temperature reached 110° C., 2.0 grams of 16.67% 1,1'-azobis(cyanocyclohexane) (Vazo 88), solution in toluene, 0.15 gram of acrylic acid and 1.0 gram of ethylhexyl acrylate were added, followed by feeding simultaneously the mixture of 40.7 grams of ethylhexyl acrylate and 5.85 grams of acrylic acid over 3 hours and 10.0 grams of the above 1,1'-azobis(cyanocyclohexane) solution over 3 hours and 5 minutes. The reaction temperature were kept at 108-110° C. during the addition and extended to another hour. To eliminate any residual ethylhexyl acrylate, 0.50 grams of the above 1,1'-azobis(cyanocyclohexane) solution was added, the batch was kept at 110° C. for one hour. Toluene was then stripped in house vacuum. The product so prepared was soluble in water and is a good emulsifier as tested with toluene in water.

EXAMPLE 4

A reactive polymeric surfactant with reactive group on hydrophobic segment was made as follows. To a 500 ml of reaction flask equipped with mechanic stirrer, nitrogen inlet, condenser and thermometer was charged 90 grams of allyl alcohol ethoxylate (20 mols of EO per mole (APEG-20)). The reactor contents were heated to 108° C. over 45 to 60 minutes under nitrogent sparge and stirring. Mixing and sparging were each maintained through the reaction. Once the temperature reached 108° C., 0.30 grams of 1,1'-azobis(cyanocyclohexane), (Vazo 88), in 1.5 grams of toluene, 0.14 gram of tert-butylaminoethyl methacrylate (known as Ageflex FM-4 from Ciba Specialty Chemicals) and 0.93 gram of ethylhexyl acrylate were added, followed by feeding simultaneously a mixture of 36.1 grams of ethylhexyl acrylate and 5.6 grams of tert-butylaminoethyl methacrylate over 3 hours and 1.5 grams of 1,1'-azobis(cyanocyclohexane) in 9.0 grams of toluene over 3 hours and 5 minutes. The reaction temperature were kept at 108-110° C. during the addition and extended to another two hours. The reaction mixture was cooled to 90° C. and 0.06 grams of 2,2'-azobis(2-methylbutyronitrile) was added. The batch was held at 90° C. for one hour. The product so prepared was soluble in water and is a good emulsifier as tested with toluene in water.

EXAMPLE 5

A reactive polymeric surfactant analogous to the surfactant of Example 4 above was made by a process analogous to that used to make the surfactant of Example 4, except that allyl alcohol ethoxylate of 60 moles of EO per mole (Rhodasurf AAE-60), which is water soluble, was substituted for the 20 mole ethoxylate used in Example 4.

EXAMPLE 6

A reactive polymeric surfactant analogous to the surfactant of Example 5 above was made by a process analogous to that used to make the surfactant of Example 5, except the polymer was prepared in a different solvent with 2,2'-azobis(2-methylbutyronitrile). To a 500 ml of reaction flask equipped with mechanic stirrer, nitrogen inlet, condenser and thermometer was charged 126.6 grams of allyl alcohol ethoxylate (60 moles of EO per mole (APEG-60) and 15.0 grams of ethanol. The reactor contents were heated to 90° C. over 45 to 60 minutes under nitrogent sparge and stirring. Mixing and sparging were each maintained through the reaction. Once the temperature reached 90° C., 3.52 grams of 2,2'-azobis(2-methylbutyronitrile) in 25 grams of ethanol and a mixture of 52.0 grams of ethylhexyl acrylate and 8.1 grams of tert-butylaminoethyl methacrylate were fed simultaneously but separately over 3 hours and 3 hours and 5 minutes respectively. The reaction temperature were kept at 90° C. during the addition and extended to another one hours. After that 0.15 grams of 2,2'-azobis(2-methylbutyronitrile) was added. The batch was held at 90° C. for one hour. The product so prepared was soluble in water, but gave a hazy solution.

EXAMPLE 7

A non-ionic reactive polymeric surfactant was made from vinyloxybutoxypolyethylene glycol (VPEG). To a 250 ml of reaction flask equipped with mechanic stirrer, nitrogen inlet, condenser and thermometer was charged 100 grams of vinyloxybutyl alcohol ethoxylate of 20 mols of EO (VPEG-20, available from Clariant or by ethoxylating vinyl hydroxylbutyl ether). The content was heated to 100° C. over 45 to 60 minutes under nitrogent sparge and stirring. Mixing and sparging was maintained through the reaction. Once the temperature reached 100° C., 47.0 grams of ethylhexyl acrylate and 1.0 grams of 1,1'-azobis(cyanocyclohexane) in 10 grams of toluene were fed simultaneous but separately over 3 hours and 3 hours 5 minutes, respectively. The reaction temperature were kept at 100° C. during the addition and extended to another hour. To eliminate any residual ethylhexyl acrylate, 0.60 grams of the above 1,1'-azobis(cyanocyclohexane) solution was added, the batch was kept at 100° C. for one hour. Toluene was then stripped in house vacuum. The product so prepared was soluble in water and is a good emulsifier as tested with toluene in water.

EXAMPLE 8

An anionic reactive polymeric surfactant was made from vinyloxybutoxypolyethylene glycol (VPEG). To a 250 ml of reaction flask equipped with mechanic stirrer, nitrogen inlet, condenser and thermometer was charged 100 grams of vinyloxybutyl alcohol ethoxylate of 20 mols of EO (VPEG-20). The content was heated to 100° C. over 45 to 60 minutes under nitrogent sparge and stirring. Mixing and sparging was maintained through the reaction. Once the temperature reached 100° C., a mixture of 44.2 grams of ethylhexyl acrylate and 3.0 grams of acrylic acid neutralized to pH 8.5 (measured in water) by N,N-dimethylaminocyclohexane and 1.0 grams of sodium persulfate in 20 grams of water were fed simultaneous but separately over 3 hours and 3 hours 5 minutes respectively. The reaction temperature were kept at 100° C. during the addition and extended to another hour. The batch turned cloudy. The product so prepared was soluble in water to give a hazy solution.

EXAMPLES 7 and COMPARATIVE EXAMPLE C7

An emulsion was prepared using the reactive polymer surfactant of Example 2. The reactive polymeric surfactant of Example 2 (1.6 grams) was dissolved in 60.0 grams of water, while soybean oil (40.0 grams) was mixed with 1.6 grams of Tolonate HDT LV2 (from Rhodia Inc) and 0.05 grams of dibutyltin dilaurate. The two phases were then homogenized at 40-50° C. for 3 minutes at 5000 rpm. The pH of the emulsion was adjusted from 5.2 to about 8.0. The emulsion so obtained was kept at 60-65° C. for 2 hours. An emulsion without Tolonate HDT LV2 was also prepared as Comparative Example C7. The emulsion of Example 7 showed no visual evidence of phase separation two days after its formation, while phase separation of Comparative Example C7 was observed within hours of its formation.

The invention claimed is:
1. A method for stabilizing an emulsion of a discontinuous liquid phase in a continuous liquid phase, wherein one of such phases comprises an aqueous liquid and the other of such phases comprises a water immiscible liquid, comprising:
(a) providing:
(i) a reactive crosslinkable polymeric surfactant, comprising:
(1) at least two hydrophilic monomeric units per molecule, each independently according to formula (I):

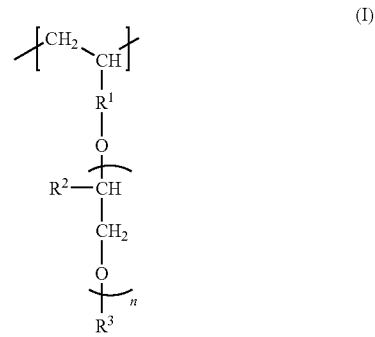

wherein:
$R^1$ is alkylene or oxyalkylene,
$R^2$ is H, methyl, or ethyl,
$R^3$ is H, and
n is greater than about 5, and
(2) one or more hydrophobic monomeric units per molecule, each independently according to formula (II):

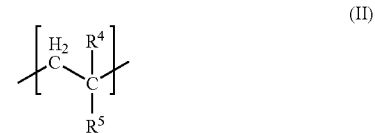

wherein:
$R^4$ is H or methyl,
$R^5$ is a hydrophobic group,
wherein the polymeric surfactant comprises from about 20 to about 90 percent by weight monomeric units according to formula (I), from about 10 to about 80 percent by weight monomeric units according to formula (II) and is water soluble, and
(ii) a crosslinking agent for the reactive polymeric surfactant at an interface between the discontinuous liquid phase and the continuous liquid phase, and (b) reacting the reactive polymeric surfactant with the crosslinking agent to form a polymer network at the interface.

2. The method of claim 1, wherein $R^3$ is H, and the crosslinking agent is an isocyanate-functional crosslinking agent.

3. The method of claim 1, wherein:
$R^1$ is methylene or oxyalkylene,
$R^2$ and $R^3$ are each H,
n is from about 10 to about 60,
$R^4$ is H or methyl,
$R^5$ is

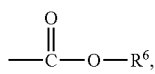

and
$R^6$ is alkyl, cycloalkyl, aryl, or aralkyl.

4. The method of claim 1, wherein the polymeric surfactant further comprises one or more monomeric units per molecule, each independently according to formula (III):

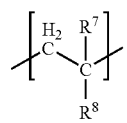

wherein
$R^7$ is H or methyl, and
$R^8$ is alkenyl, aminoalkyl, hydroxyalkyl, glycidalalkyl, a quaternary ammonium salt group, an acid group, an acid salt group,

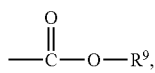

or

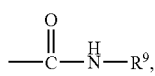

and
$R^9$ is H, aminoalkyl, hydroxyalkyl, glycidal alkyl, a quaternary ammonium salt group, an acid group, or an acid salt group.

5. The method of claim 1, wherein the polymeric surfactant exhibits a weight average molecular weight of from about 1,000 to about 200,000 grams per mole.

6. The method of claim 1, wherein:
the continuous liquid phase is a continuous aqueous phase,
the discontinuous liquid phase is a water immiscible liquid phase.

7. The method of claim 6, wherein:
a mixture comprising an aqueous phase, the reactive polymeric surfactant, the crosslinking agent for the reactive polymeric surfactant, and a water immiscible liquid is mixed to disperse the water immiscible liquid as the discontinuous phase in the continuous aqueous phase, and the reactive polymeric surfactant and the crosslinking agent are reacted at the interface between the continuous aqueous phase and the discontinuous water immiscible liquid phase to form the polymer network.

8. The method of claim 7, wherein the mixture comprise:
from about 30 to about 95 parts by weight of an aqueous medium,
from about 70 to about 5 parts by weight water immiscible liquid,
from about 0.05 to about 20 parts by weight reactive polymeric surfactant per 100 parts by weight water immiscible liquid, and
from about 0.05 parts by weight to about 20 parts by weight crosslinking agent per 100 parts by weight of water immiscible liquid.

9. An emulsion, comprising:
(a) an aqueous liquid phase,
(b) a water immiscible liquid phase, there being at least one interface between the aqueous liquid phase and the water immiscible liquid phase, and
(c) a polymer network disposed at the at least one interface, wherein said polymeric network comprises the reaction product of:
(i) a reactive crosslinkable polymeric surfactant, comprising:
(1) at least two hydrophilic monomeric units per molecule, each independently according to formula (I):

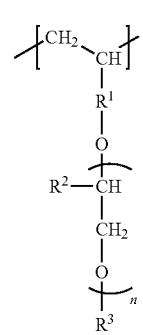

wherein:
$R^1$ is alkylene or oxyalkylene,
$R^2$ is H, methyl, or ethyl,
$R^3$ is H, and
n is greater than about 5, and
(2) one or more hydrophobic monomeric units per molecule, each independently according to formula (II):

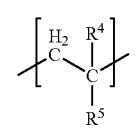

wherein:
$R^4$ is H or methyl,
$R^5$ is a hydrophobic group,
wherein the polymeric surfactant comprises from about 20 to about 90 percent by weight monomeric units according to formula (I), from about 10 to about 80 percent by weight monomeric units according to formula (II) and is water soluble, and
(ii) a crosslinking agent for the reactive surfactant.

10. The emulsion of claim 9, wherein $R^3$ is H, and the crosslinking agent is an isocyanate-functional crosslinking agent.

11. The emulsion of claim 9, wherein:
$R^1$ is methylene or oxyalkylene,
$R^2$ and $R^3$ are each H,
n is from about 10 to about 60,
$R^4$ is H or methyl,
$R^5$ is

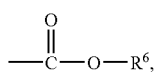

and
$R^6$ is alkyl, cycloalkyl, aryl, or aralkyl.

12. The emulsion of claim 9, wherein the polymeric surfactant further comprises one or more monomeric units per molecule, each independently according to formula (III):

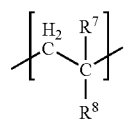

wherein
$R^7$ is H or methyl, and
$R^8$ is alkenyl, aminoalkyl, hydroxyalkyl, glycidalalkyl, a quaternary ammonium salt group, an acid group, an acid salt group,

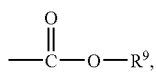

or

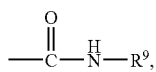

and
$R^9$ is H, aminoalkyl, hydroxyalkyl, glycidal alkyl, a quaternary ammonium salt group, an acid group, or an acid salt group.

13. The emulsion of claim 9, wherein the polymeric surfactant exhibits a weight average molecular weight of from about 1,000 to about 200,000 grams per mole.

14. The emulsion of claim 9, wherein the emulsion comprises a discontinuous aqueous liquid phase dispersed in a continuous water immiscible liquid phase.

15. The emulsion of claim 9, wherein the emulsion comprises a discontinuous water immiscible phase dispersed in a continuous aqueous liquid phase.

16. The emulsion of claim 15, wherein the water immiscible liquid phase comprises water immiscible liquid selected from water immiscible hydrocarbon solvents, herbicides, insecticides, fungicides, bactericides, plant growth regulators, fertilizers, dyes, inks, and pharmaceutical active ingredients.

17. The emulsion of claim 16, wherein the discontinuous phase is in the form of droplets, at least a portion of which are each encapsulated within a substantially continuous shell of the polymer network.

18. A method for stabilizing a dispersion of solid particles in an aqueous medium, comprising:
(a) providing:
(i) a reactive crosslinkable polymeric surfactant comprising:
(1) at least two hydrophilic monomeric units per molecule, each independently according to formula (I):

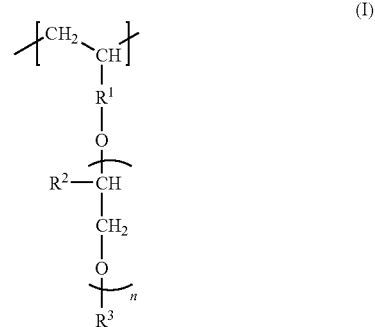

wherein:
$R^1$ is alkylene or oxyalkylene,
$R^2$ is H, methyl, or ethyl,
$R^3$ is H, and
n is greater than about 5, and
(2) one or more hydrophobic monomeric units per molecule, each independently according to formula (II):

wherein:
$R^4$ is H or methyl,
$R^5$ is a hydrophobic group,
wherein the polymeric surfactant comprises from about 20 to about 90 percent by weight monomeric units according to formula (I), from about 10 to about 80 percent by weight monomeric units according to formula (II) and is water soluble, and
(ii) a crosslinking agent for the reactive polymeric surfactant at an interface between the solid particles and the aqueous medium, and
(b) reacting the reactive polymeric surfactant with the crosslinking agent to form a polymer network at the interface.

19. The method of claim 18, wherein $R^3$ is H, and the crosslinking agent is an isocyanate-functional crosslinking agent.

20. The method of claim 18, wherein:
$R^1$ is methylene or oxyalkylene,
$R^2$ and $R^3$ are each H, n is from about 10 to about 60,
$R^4$ is H or methyl,
$R^5$ is

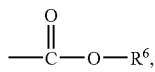

and $R^6$ is alkyl, cycloalkyl, aryl, or aralkyl.

21. The method of claim 18, wherein the polymeric surfactant further comprises one or more monomeric units per molecule, each independently according to formula (III):

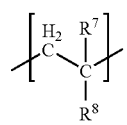

(III)

wherein $R^7$ is H or methyl, and $R^8$ is alkenyl, aminoalkyl, hydroxyalkyl, glycidalalkyl, a quaternary ammonium salt group, an acid group, an acid salt group,

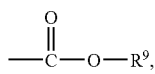

or

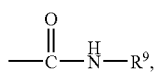

and $R^9$ is H, aminoalkyl, hydroxyalkyl, glycidal alkyl, a quaternary ammonium salt group, an acid group, or an acid salt group.

22. The method of claim 18, wherein the polymeric surfactant exhibits a weight average molecular weight of from about 1,000 to about 200,000 grams per mole.

23. The method of claim 18, wherein:
a mixture comprising an aqueous phase, the reactive polymeric surfactant, the crosslinking agent for the reactive polymeric surfactant, and water insoluble particles is mixed to disperse the particles in the continuous aqueous phase, and
the reactive polymeric surfactant and the crosslinking agent are reacted at the interface between the continuous aqueous phase and the particles to form the polymer network.

24. The method of claim 23, wherein the mixture comprises from about 30 to about 95 parts by weight aqueous medium, from about 70 to about 5 parts by weight solid water insoluble particles, from about 0.05 to about 20 parts by weight reactive polymeric surfactant per 100 parts by weight water insoluble particles, and from about 0.05 parts by weight to about 20 parts by weight crosslinking agent per 100 parts by weight water insoluble particles.

25. An aqueous dispersion, comprising:

(a) an aqueous medium, and (b) one or more particles dispersed in the liquid medium, said particles each having a particle core, said particle cores each having an outer surface, and said particles each having a polymer network disposed on at least a portion of the outer surface of the particle core, wherein said polymeric network comprises the reaction product of:

(i) a reactive crosslinkable polymeric surfactant comprising:

(1) at least two hydrophilic monomeric units per molecule, each independently according to formula (I):

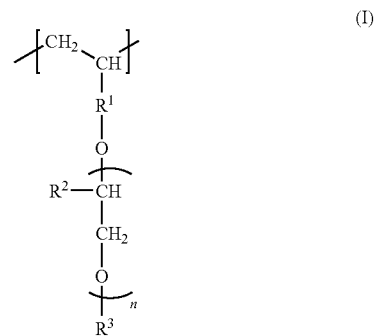

(I)

wherein:

$R^1$ is alkylene or oxyalkylene, $R^2$ is H, methyl, or ethyl, $R^3$ is H, and n is greater than about 5, and (2) one or more hydrophobic monomeric units per molecule, each independently according to formula (II):

(II)

wherein:

$R^4$ is H or methyl, $R^5$ is a hydrophobic group, wherein the polymeric surfactant comprises from about 20 to about 90 percent by weight monomeric units according to formula (I), from about 10 to about 80 percent by weight monomeric units according to formula (II) and is water soluble, and (ii) a crosslinking agent for the reactive surfactant.

26. The aqueous dispersion of claim 25, wherein $R^3$ is H, and the crosslinking agent is an isocyanate-functional crosslinking agent.

27. The dispersion of claim 25, wherein:

$R^1$ is methylene or oxyalkylene, $R^2$ and $R^3$ are each H, n is from about 10 to about 60, $R^4$ is H or methyl, $R^5$ is

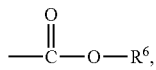

and $R^6$ is alkyl, cycloalkyl, aryl, or aralkyl.

28. The dispersion of claim 25, wherein the polymeric surfactant further comprises one or more monomeric units per molecule, each independently according to formula (III):

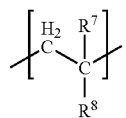

(III)

wherein $R^7$ is H or methyl, and $R^8$ is alkenyl, aminoalkyl, hydroxyalkyl, glycidalalkyl, a quaternary ammonium salt group, an acid group, an acid salt group,

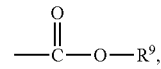

or

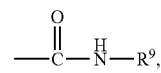

and $R^9$ is H, aminoalkyl, hydroxyalkyl, glycidal alkyl, a quaternary ammonium salt group, an acid group, or an acid salt group.

29. The dispersion of claim 25, wherein the polymeric surfactant exhibits a weight average molecular weight of from about 1,000 to about 200,000 grams per mole.

30. The dispersion of claim 25, wherein dispersion comprises solid water insoluble particles or solid partially water soluble particles.

31. The dispersion of claim 25, wherein dispersion comprises particles comprising the particle core surrounded by a substantially continuous shell of the polymer network.

32. The dispersion of claim 31, wherein the particle core comprises a solid pesticide, herbicide, insecticide, fungicide, bactericide, plant growth regulator, fertilizer, dye, ink, or pharmaceutical active ingredient.

* * * * *